United States Patent [19]

Izawa et al.

[11] Patent Number: 4,870,493
[45] Date of Patent: Sep. 26, 1989

[54] SOLID-STATE MATRIX ARRAY IMAGING DEVICE CONTROLLED BY VERTICAL SCANNING REGISTERS FOR READ-OUT AND FOR PHOTO-SENSITIVITY CONTROL

[75] Inventors: Tetsurou Izawa, Mobara; Toshio Miyazawa, Chiba; Shigeki Nishizawa, Mobara; Iwao Takemoto, Mobara; Kouzou Yasuda, Mobara, all of Japan

[73] Assignee: Hitachi, Ltd., Tokyo, Japan

[21] Appl. No.: 79,526

[22] Filed: Jul. 30, 1987

[30] Foreign Application Priority Data

Aug. 1, 1986 [JP] Japan ................................. 61-179902
Apr. 3, 1987 [JP] Japan ................................. 62-80908

[51] Int. Cl.4 ............................................. H04N 3/14
[52] U.S. Cl. ................................. 358/213.19; 358/228
[58] Field of Search .......................... 358/213.19, 228; 250/578

[56] References Cited

U.S. PATENT DOCUMENTS

| | | | |
|---|---|---|---|
| 4,335,405 | 6/1982 | Sakane et al. | 358/213.19 |
| 4,547,806 | 10/1985 | Herbst et al. | 358/212 |
| 4,573,076 | 2/1986 | Tisue et al. | 358/213.19 |
| 4,574,309 | 3/1986 | Arisawa et al. | 358/213.19 |
| 4,589,024 | 5/1986 | Koch et al. | 358/213.19 |
| 4,628,364 | 12/1986 | Koch | 358/213.19 |

Primary Examiner—Jin F. Ng
Assistant Examiner—Stephen Brinich
Attorney, Agent, or Firm—Antonelli, Terry & Wands

[57] ABSTRACT

Disclosed is a solid state imaging device with a first and a second vertical scanning register for full-electrically setting the photo-sensitivity of a TV camera in accordance with the difference of the vertical scanning timing.

15 Claims, 2 Drawing Sheets

SOLID-STATE MATRIX ARRAY IMAGING DEVICE CONTROLLED BY VERTICAL SCANNING REGISTERS FOR READ-OUT AND FOR PHOTO-SENSITIVITY CONTROL

FIELD OF THE INVENTION

The present invention relates to an image pickup device and, more specifically, to the art which is effective when utilized into a solid state image pickup device having the function that an image signal formed by a photoelectric conversion element is extracted through a MOSFET (insulated gate type field effect transistor) and the sensitivity thereof may be varied.

BACKGROUND OF THE INVENTION

Solid state image pickup devices combining a photodiode and switch MOS FET have been well known. Such an solid state image pickup device has been reported in the Laid-open Pat. No. 152382/1981. A television camera for monitoring and household use utilizing said solid state image pickup device is provided with the automatic aperture at the optical lens.

Lens used with automatic aperture requires rather complicated mechanical parts, resulting in enlargement of lens and increase in manufacturing cost of television camera. Moreover, said automatic aperture mechanism is composed of rather complicated mechanical parts and therefore the question of reliability arises because of problems that may result from friction of the mechanical parts.

SUMMARY OF THE INVENTION

It is therefore an object of the present invention to provide a solid state image pickup device which assures high quality images and has the variable sensitivity function.

Further features and advantages of the present invention will be apparent from the ensuing description with reference to the accompanying drawings to which, however, the scope of the invention is in no way to be construed as being limited.

The basic invention disclosed by the present application can be briefly explained hereunder. Namely, a first scanning circuit which outputs in time series the signals of a plurality of picture element cells arranged in the form of a matrix and a second scanning circuit which executes the selecting operation in the vertical scanning direction with the address independent of the selected address in the vertical scanning direction by said first scanning circuit are provided. The sensitivity is then changed by operating precedingly said second scanning circuit and an external terminal, which forces all horizontal scanning lines for selecting the horizontal scanning direction of picture element cells arranged in the form of matrix to be set to the selected condition, is also provided.

According to this means, the picture element signal of the preceding rows can be reset within the horizontal retrace period by the simultaneous selection signal from said second scanning circuit and external terminal. Thereby, the picture element signal does not appear on the horizontal signal lines corresponding to the preceding vertical scanning lines and therefore the coupling for the readout picture element signal can substantially be prevented.

DETAILED DESCRIPTION OF THE INVENTION

Figure 1:
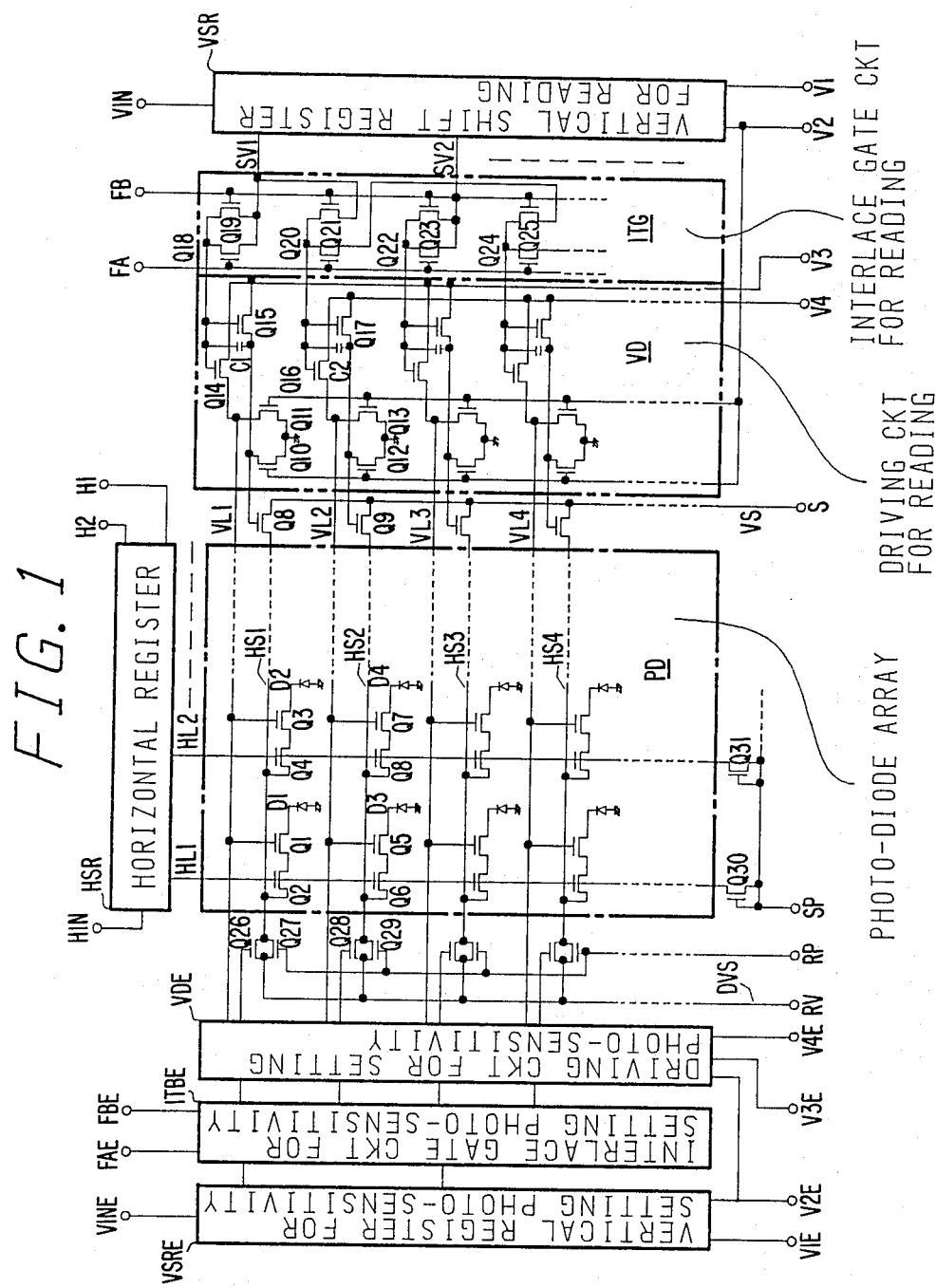
FIG. 1 is a circuit diagram of the essential portion illustrating a preferred embodiment of a solid state image pickup device of the present invention.

FIG. 1 illustrates a circuit diagram of a essential portion of a preferred embodiment of a solid state image pickup device of the TSL (Transversal Signal Line) system to which the present invention is applied. Each circuit element in the same figure is formed on a semiconductor substrate, although not particularly limited thereto, like a single crystal silicon by well known semiconductor integrated circuit manufacturing technology. The major blocks are depicted in line with the actual geometrical arrangement.

For example, a matrix array of 4-row and 2-column is indicated as the picture element array PD. However, for simplification of drawing, only the picture element cells of two rows among said 4 rows are illustrated with the circuit symbols. A picture element cell is formed by a series circuit of a photo diode D1, a switch MOSFET Q1 having its gate coupled with the vertical scanning line VL1 and a switch MOSFET Q2 having its gate coupled with the horizontal scanning line HL1. The output nodes of other similar picture element cells (D2, Q3, Q4) arranged in the same row (horizontal direction) as said picture element cell consisting of the photo diode D1 and switches MOSFET Q1, Q2 is connected with the horizontal signal line HS1 extended in the lateral direction in FIG. 1. For the remaining rows, the picture element cells similarly disposed are also coupled as explained above.

The horizontal scanning line HL1 indicated as an example is extended in the perpendicular direction in the same figure and connected in common to the gate of the MOSFET switches Q2, Q6 of the picture element cells arranged in the same column. The picture element cells arranged in the other columns are also connected with the corresponding horizontal scanning line HL2 in the same way.

In this embodiment, the MOSFET switches Q8, Q9 and Q26, Q28 are provided respectively at both ends of the horizontal signal lines HS1 to HS4 forming said picture element array in order to add a substantially automatic aperture mechanism to the solid state image pickup device, i.e., vary the substantial accummulation period of the photo diodes. MOSFET switches Q8, Q9 arranged at the right end side respectively connect the horizontal signal lines HS1, HS2 to the output line VS extended in the perpendicular direction. This output line VS is connected with the terminal S and a readout signal is transmitted through the terminal S to the input of an externally provided preamplifier Moreover, MOSFET switches Q26, Q28 arranged at the left end side respectively connect said horizontal signal lines HS1, HS2 to a dummy (reset) output line DVS extended in the perpendicular direction. This output line DVS is connected, although not limited, to the terminal RV. Thereby, if necessary, the signal of said dummy output line DVS is transmitted through the external terminal RV.

In this embodiment, although not limited thereto, horizontal signal lines HS1 to HS4 of each row are provided with the MOSFET switches Q27, 29 which are turned ON by the reset signal supplied in the horizontal retrace period through the terminal RP. When these MOSFET switches Q27, Q29 are turned ON, a constant bias voltage (not illustrated) is applied to the horizontal signal lines HS1 to HS4 from the external terminal RV through said dummy output line DVS. The reset MOSFET switches Q27 and Q29 are provided for the following reason. The semiconductor region such as the drain, etc. of the switch MOSFET connected to said horizontal signal lines HS1 to HS4 may falsely develop a photosensitive property formed by parasitic diodes as a result of false signals (smear, blooming) accummulated in the horizontal signal lines which are floating during the non-selecting condition. In this embodiment, accordingly, all horizontal signal lines HS1 to HS4 are reset to said specified bias voltage during the horizontal retrace period as explained previously. Therefore, since the picture element signal is always extracted under the condition that any false signal present is reset, i.e. removed, regarding the selected horizontal signal lines, the false signal included in the output image signal can be reduced significantly. Such false signals (smear, blooming) are described in detail, for example, in the patent bulletin of the Laid-open Pat. No. 17276/1982.

The horizontal scanning signal generated by the horizontal shift register HSR is supplied to said horizontal scanning lines HL1 to HL2, etc.

The scanning circuit which executes vertical selecting operation (horizontal scanning operation) in said picture element array PD is formed by the following circuits.

In the case of this embodiment, a pair of scanning circuits are provided to both ends of the horizontal signal lines HS1 to HS4 of said picture element array PD, corresponding to a pair of MOSFET switches Q8, Q9 and MOSFET switches Q26, Q28.

In this embodiment, the selective simultaneous scanning for two rows and the scanning in the noninterlace mode are possible in addition to the interlace mode for application into industrial use. The following scanning circuit is provided at the right side of picture element array PD. The vertical shift register VSR forms the output signals SV1, SV2 to be used for reading operation. These output signals SV1, SV2 are supplied to said vertical scanning lines VL1 to VL4 and MOSFET switches Q8, Q9 through the interlace gate circuit ITG and drive circuit VD.

Said interlace gate circuit ITG executes the vertical selecting operation (horizontal scanning operation) in the interlace mode. Therefore, in the first (odd number) field, the vertical scanning lines VL1 to VL4 are selected simultaneously through the combination of the adjacent vertical scanning lines VL1, VL2 and VL3. Namely, The output signal SV1 of vertical shift register VSR is output to the vertical scanning line VL1 which selects the horizontal signal line HS1 by the switch MOSFET Q18 which is controlled by the odd number field signal FA. In the same way, the output signal SV2 of the vertical shift register VSR is output to the vertical scanning lines VL2 and VL3 in such a manner as simultaneously selecting the horizontal signal lines HS2 and HS3 by the MOSFET switch Q20 and Q22 which are controlled by the signal FA. In this way, the selecting signal for a pair of horizontal signal lines consisting of the combination in the same sequence can be formed.

In the second (odd number) field, the vertical scanning lines VL1 to VL4 are selected simultaneously through combination of the adjacent vertical scanning lines VL1, VL2 and VL3, VL4. Namely, the output signal SV1 of the vertical shift register VSR is output to the vertical scanning lines VL1 and VL2 which select the horizontal signal lines HS1 and HS2 by the MOSFET switches Q19, Q21 which are controlled by the even number field signal FB. In the same way, the output signal SV2 of vertical shift register VSR is output to the vertical scanning lines VL3 and VL4 in order to simultaneously select the horizontal signal lines HS3 and HS4 by the switches MOSFET Q23 and Q25 which are controlled by the signal FB. In this way, the selecting signal for a pair of horizontal signal lines consisting of the combination in the same sequence can be formed.

A plurality of kinds of horizontal scanning operations explained hereunder are realized by said interlace gate circuit ITG and the following drive circuit DV.

An output signal from the interlace gate circuit ITG corresponding to said one vertical scanning line VL1 is supplied to the gates of MOSFET switches Q14 and Q15. The drain electrode common to these MOSFET switches Q14 and Q15 is connected to the terminal V3. MOSFET switch Q14 is supplies the signal sent from the terminal V3 to said vertical scanning line VL1. In addition, the MOSFET switch Q15 supplies the signal sent from said terminal V3 to the gate of MOSFET switch Q8 which connects the horizontal signal line HS1 to the output line VS. Moreover, with respect to preventing the lowering of the high level of output signal by as much as the threshold voltage of the switch MOSFET Q14, 15, although not limited thereto, a capacitor C1 is provided between the gate of MOSFET Q14 and the output side (source side) of MOSFET Q15. Thereby, when the output signal from the interlace gate circuit ITG is set to a high level, voltage of the terminal V3 is set to a low level and thereby the capacitor C1 is precharged. Thereafter, when a voltage of terminal V3 is set to a high level, the gate voltage of said MOSFET Q14 and Q15 can be increased by the bootstrap effect of the capacitor C1.

An output signal from the interlace gate circuit ITG corresponding to the vertical scanning line VL2 adjacent to said vertical scanning line VL1 is supplied to the gate of MOSFET switches Q16 and Q17. The common drain electrode of these MOSFET switches Q16 and Q17 is connected with the terminal V4. Said switch MOSFET Q16 supplies the signal sent from the terminal V4 to said vertical scanning line VL2. Moreover, the switch MOSFET Q17 supplies the signal sent from said terminal V4 to the gate of switch MOSFET Q9 which connects the horizontal signal line HS2 to the output line VS. Moreover, a capacitor C2 is provided, although not limited thereto, between the gate of MOSFET Q16 and the output side (source side) of MOSFET Q17 in order to prevent the lowering of the high level of output signal by as much as the threshold voltage of the MOSFET switches Q16, Q17. Accordingly, the gate voltages of said MOSFETs Q16 and Q17 can be boosted owing to the bootstrap effect of capacitor C2 by changing a voltage of terminal V4 in a similar timing operation as explained previously.

Terminal V3 is provided in common to the switch MOSFET so as to drive the corresponding vertical scanning lines (horizontal signal lines) of odd numbers, while the terminal V4 is provided in common to the vertical scanning lines (horizontal signal lines) of even numbers.

As will be understood from above explanation, the read operation by the interlace mode can be realized by the combination of selectively applying a timing signal to the terminals V3 and V4 and simultaneously selecting operations to two lines by said interlace gate circuit ITG. For example, the vertical scanning lines (horizontal signal lines) can be selected in the sequence of VL1 (HS1), VL3(HS3) by supplying the timing signal being synchronized with operations of said vertical shift register VSR to the terminal V3 under the condition that the terminal V4 is set to a low level in the odd number fields FA. In addition, the vertical scanning lines (horizontal signal lines) can be selected in the sequence of VL2(HS2) and VL4(HS4) by supplying the timing signal being synchronized with operations of said shift register VSR to the terminal V4 under the condition that the terminal V3 is set to a low level in the even number fields FB.

Meanwhile, when said terminals V4 and V3 are set to a high level simultaneously as in the above case, the 2-line simultaneous scanning can be realized in accordance with an output signal from said interlace gate circuit ITG. In this case, the vertical shift of spacial gravity, in other words, equivalent interlace mode can be realized because combination of two rows output for two screens by two field signals FA and FB is shifted vertically as much as a single line as explained previously.

Moreover, for example, the selecting operations in the non-interlace mode can also be realized in the sequence of VL1, VL2, VL3 and VL4 by setting only the FB signal to high level and operating twice the horizontal shift registers HSR at the one vertical scanning timing and then setting the terminals V3 and V4 to high level in synchronization with such operations. In this case, it is desirable that the clock frequency supplied to the horizontal shift register HSR and vertical shift register VSR is doubled. Namely, the images can be read at a rate of 60 frames/sec by the non-interlace system by doubling the frequency of the clock signal supplied to the horizontal shift register HSR and vertical shift register VSR from the terminals H1, H2 and terminals V1, V2. The terminals HIN and VIN are provided for supplying the input signals which are respectively shifted by said shift registers HSR, VSR and the shift operation is started in such a timing that the input signal is applied. Therefore, on the occasion of carrying out said 2-row simultaneous reading, interlace scanning and non-interlace scanning through a combination of the input signals applied to said interlace gate circuit ITG and input terminals V3, V4, consideration is necessary to the timing in supply of input signal to said shift register VSR so that geometrical relation in the vertical direction of the output signal is not inversed.

In addition, the MOSFETs Q10 and Q11 for reset are provided among each said vertical scanning line VL1, gate of switch MOSFET Q8 corresponding thereto and grounding potential points of circuits. These reset MOSFETs Q10 and Q11 receive the clock signal supplied from the terminal V2 in common to the MOSFET for reset provided corresponding to the other vertical scanning line and switch MOSFET and set at a high speed the voltage of said selected vertical scanning line and the gate of switch MOSFET to low level.

In the case of this embodiment, in view of adding the sensitivity varying function as described previously, the vertical shift register VSRE, interface gate circuit ITG and drive circuit DVE for controlling sensitivity are provided. These circuits for sensitivity control are arranged, although not limited thereto, as shown in the left side for said picture element array PD. The scanning shift register VSRE the, interlace gate circuit ITGE and the drive circuit DVE are formed by similar circuits to those of said vertical scanning shift register VSR, interlace gate circuit ITG and drive circuit DV for readout operation. The similar timing signals are also supplied from the terminals V1E to V4E, VINE and FAE, FBE, respectively. In this case, the same clock signal is supplied, although not limited thereto to the terminals V1E, V1 and V2E, V2 in order to realize the shift operation in the synchronized timing of said vertical shift register VSR for readout operation and said vertical shift register VSRE for varying the sensitivity. Accordingly, said terminals V1E, V1 and V2E, V2 may be arranged in common by the internal circuit. As explained previously, individual terminals V1E and V2E are provided in order to realize that a solid state image pickup device is introduced into a television camera having the manual aperture function or existing mechanical aperture function. In case the sensitivity varying operation is not carried out as explained above, generation of useless power consumption of said vertical scanning shift register VSRE can be suppressed by setting said terminals V1E and V2E to such a low level as the grounding potential of the circuit.

Next, the sensitivity control operation in the solid state image pickup device of the present embodiment is explained hereunder.

For simplification of explanation, the vertical scanning operation by said non-interlace mode is explained as an example. For instance, the selecting operation of the fourth row (vertical scanning line VL4, horizontal signal line HS4) is carried out in parallel with the readout operation of the first row (vertical scanning line VL1, horizontal signal line HS1) by the vertical shift register VSRE, interlace gate circuit ITG and drive circuit DVE for sensitivity control. Thereby, the optical signals being accummulated in the photo diodes D1, D2, etc. of the first row are read on a time series basis to the output signal line VS in synchronization with the selecting operation of the horizontal scanning lines HL1, HL2 formed by the horizontal shift register HSR. This readout operation is carried out by supply of a current corresponding to said optical signal sent from the terminal S through a load resistance and the precharge (reset) operation is carried out simultaneously with the readout operation. Similar operations are also carried out for the photo diodes of the fourth row. In this case, the readout operation of the fourth row is carried out for the dummy output line DVS by said scanning circuits (VSRE, ITGE, DVE) for varying sensitivity. In case only the sensitivity control is carried out, a bias voltage which is the same as that of terminal S is applied to the terminal RV. Thereby, the optical signal already accummulated in each picture element cell of the fourth line is exhausted, in other words, the reset operation is carried out.

Accordingly, since the readout operation of the fourth row (vertical scanning line VL4, horizontal signal line HS4) by the vertical shift register VSR, interlace gate circuit ITG and drive circuit DV is carried out by said vertical scanning operation after the readout operations of first row to third row, the accummulation time of photo diodes of picture element cells arranged for the fourth row becomes equal to the readout time of picture element cells of three rows.

In place of above operation, the selecting operation of the second row (vertical scanning line VL2, horizontal signal line HS2) is carried out, in parallel with the readout operation of the first row (vertical scanning line VL1, horizontal signal line HS1) by the vertical shift register VSR, interlace gate circuit ITG and drive circuit DV, by the vertical shift register VSRE, interlace gate circuit ITGE and drive circuit VDE for sensitivity control. Thereby, the optical signal accummulated in the photo diodes D1, D2 for the first row are read on a time series basis to the output signal line VS in synchronization with the selecting operation of the horizontal scanning lines HL1, HL2 formed by the horizontal shift register HSR. This readout operation is carried out by supply of a current corresponding to said optical signal from the terminal S through a load resistance and the precharge (reset) operation is also carried out simultaneously with such readout operation. Similar operations are also carried out to the photo diodes D3, D4 of the second row. Thereby, the optical signal accummulated in the picture element cells of the second row is exhausted in parallel with the readout operation of the first row. Therefore, since the readout operation of the second row (vertical scanning line VL2, horizontal signal line HS2) by the vertical shift register VSR, interlace gate circuit ITG and drive circuit VD is carried out after the readout operation of the first row by said vertical scanning operation, the accummulation time of photo diode of picture element cells arranged for the second row becomes equal to the readout time of the picture element cells for a single row. Therefore, in comparison with above case, the substantial accummulation time of photo diode can be reduced to ½, in other words, sensitivity can be lowered to ½.

As explained previously, since the picture element cells of the relevant row are reset by the preceding vertical scanning operation to be carried out by the scanning circuit for sensitivity control, the time from such reset operation to actual readout operation by said scanning circuit for readout operation is considered as the accummulation time for the photo diode. Accordingly, in the case of picture element array of 525 rows, the accummulation time, in other words, the sensitivity can be set in the 525 steps in maximum in unit (minimum) of the readout time for a single row by designation of different addresses by said both vertical scanning circuits and selecting operation of the picture element cells by the common horizontal scanning circuit. However, it is assumed that change of illuminance at the light sensitive surface can be neglected for the scanning time to form one frame and constant light is substantially incident on the photo diode. The maximum sensitivity (525) can be obtained when the scanning circuit for sensitivity control is not operated.

In the case of said sensitivity control operation, the readout operation of picture element signal and the reset operation by the preceding vertical scanning operation are conducted in parallel. Thereby, in some cases, the picture element signal for reset operation may be mixed with the readout signal by the capacitive coupling through the substrate. If such capacitive coupling is generated, noise is generated in the readout picture element signal like ghost in the television receiver, deteriorating the image quality.

Therefore, this embodiment is provided with the function to force all horizontal scanning lines to be selected from the external terminal SP through the diode-connected MOSFETs Q30, Q31 for said horizontal scanning lines HL1, HL2. Namely, when said terminal SP is set to high level, all diode type MOSFETs Q30, Q31 become ON, irrespective of operation of the horizontal shift register HSR, supplying high level state to all horizontal scanning lines HL1, HL2 setting them to the selected condition. Moreover, since said selection level is supplied through the unidirectional element such as said diode-connected MOSFETs Q30, Q31, if said terminal SP is set to a low level, said MOSFETs Q30, Q31 maintain the OFF state. Thereby, if said forcible simultaneous selection circuit is provided, it does not prevent the operation that the horizontal scanning lines HL1, HL2 conforming to the shift operation of the horizontal shift register HSR are set to the selection level. If the shift operation is adversely effectuated by said forcible selection level of the horizontal scanning lines HL1, HL2 because the horizontal shift register HSR is formed by a dynamic circuit, a switch circuit is added so that said selection level is no longer transferred internally to the horizontal shift register HSR.

Said simultaneous selecting operation of the horizontal scanning lines HL1, HL2 is carried out during the horizontal retrace period as described later and said preceding vertical scanning is started. Thereby the signal of all picture elements of rows to be reset can be forced to a reset condition beforehand. Therefore, the picture element signal is not substantially output from the preceding rows during the readout operation of picture element signal in accordance with the selecting operation of the horizontal scanning line by said horizontal shift register HSR. Accordingly, said noise does not appear in the readout signal even in the case said capacitive coupling exists through said substrate.

Figure 2:
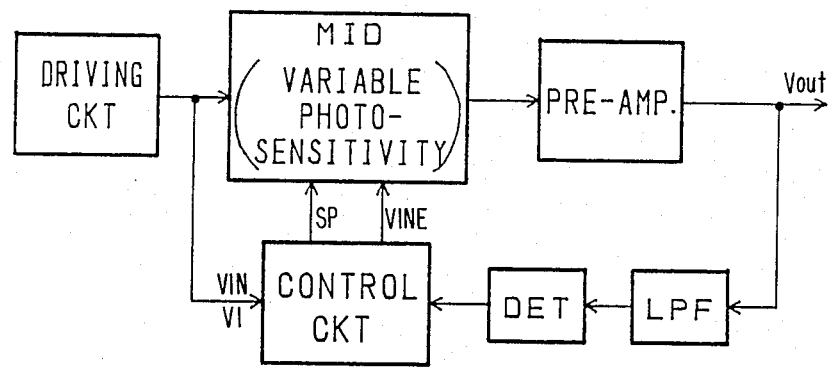
FIG. 2 is a block diagram illustrating a preferred embodiment of an image pickup structure utilizing said solid state image pickup device.

FIG. 2 illustrates a block diagram of the preferred embodiment of an image pickup means having the automatic aperture function and utilizing said solid state image pickup device.

A solid state image pickup device MID has the sensitivity varying function as illustrated in FIG. 1. The readout signal output from such solid state image pickup device MID is amplified by a preamplifier. This amplified signal $V_{out}$ is supplied, on the one hand, to the signal processing circuit not illustrated as the image signal, for example, for television. Said amplified signal $V_{out}$ is used, on the other hand, for automatic aperture control. Namely, said amplifying signal $V_{out}$ is supplied to a low-pass-filter LPF and is then converted to a mean signal level. This signal is supplied, although not limited thereto, to a detecting circuit DET and is converted therein to a DC signal. The sensitivity control circuit receives an output signal of said detecting circuit DET, then compares it with the desired degree of aperture and then forms a control signal corresponding to the optimum degree of aperture. Namely, the sensitivity control circuit receives the signals VIN and V1 sent from the drive circuit which supplies the clock signal for controlling the scanning timing as described above to the solid state image pickup device MID and forms the signal VINE which substantially precedes the readout timing of the solid state image pickup device by making reference thereto. Namely, with reference to said timing signal VIN, the preceding timing signal VINE is formed corresponding to the necessary degree of aperture (sensitivity). Therefore, the signal VINE is actually formed with a certain delay from said timing signal VIN. However, since the scanning is carried out repeatedly, the signal VIN is assumed to be delayed in the scanning for the next frame, considering from the said signal VINE. In other words, when the timing signal VINE is generated with a delay as long as one row from the timing signal VIN, the timing signal VINE is assumed in the next scanning frame as the timing signal which precedes by as much as 524 rows the timing signal VIN. Since the shift operations of vertical shift registers VSR and VSRE are started by said timing signals VIN and VINE, said sensitivity varying operation can be conducted.

The sensitivity control circuit compares, for example, the reference voltage corresponding to the desired degree of aperture with an output voltage from said detecting circuit DET and changes the degree of aperture step by step in accordance with the result of this comparison. Otherwise, said 525 steps in degree of aperture are set corresponding to binary coded signals for making high the response characteristic and the degree of aperture is determined in accordance with output signal of said voltage comparison circuit from the highest bit. For example, when the signal of detecting circuit DET is larger than the reference voltage with reference to the degree of aperture of about ½ (sensitivity 256), aperture is set to ¼ (sensitivity 128), or when it is smaller than the reference voltage, aperture is set to ¾ (sensitivity 384). Thereafter, the aperture which is equal to a half of said value is respectively determined. Thereby the one optimum aperture can be selected from the sensitivity of 525 steps by the 10 times of setting operations. If it is assumed that said aperture setting operation, namely the initial setting operation (VINE) of the vertical shift register VSRE for sensitivity control is conducted during the vertical retrace period, the optimum aperture can be set in accordance with the readout signal operation from the images of 10 frames.

Although not limited particularly, the sensitivity control circuit generates the signal SP for said forced reset operation during the horizontal retrace period. In accordance with such signal SP, the sensitivity control circuit generates the vertical selecting signal of the preceding rows in the horizontal retrace period.

In the image pickup device of the present embodiment, since the sensitivity varying function is comprised in the solid state image pickup device MID and said sensitivity is controlled electrically by deciding the level of such readout output signal, said sensitivity control circuit can also be formed by a semiconductor integrated circuit, etc. and thereby reduction in size and weight and high durability of device can be realized.

Figure 3:
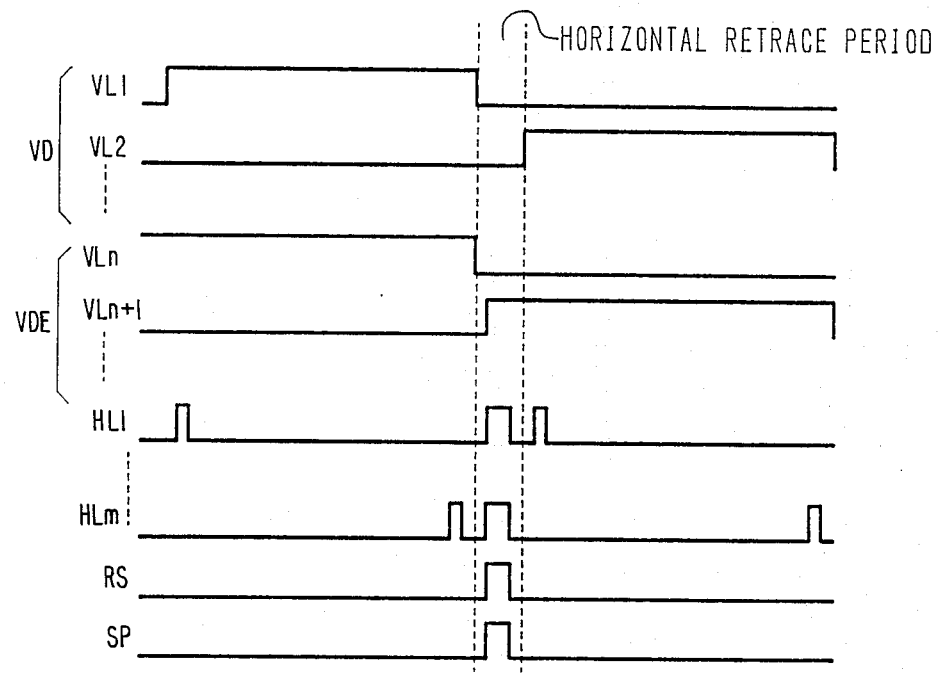
FIG. 3 is a timing chart for explaining an example of the operations of said solid state image pickup device.

FIG. 3 is a timing chart of the preferred embodiment of the readout operation of said solid state image pickup device.

For example, when the vertical scanning line VL1 is high level, the readout operation of the first row is carried out by sequentially setting the horizontal scanning lines HL1 to HLm to high level on the time series basis. Namely, a current corresponding to the optical signal accummulated in the photo diodes of the picture element cells thus selected sequentially flows and thereby the readout operation from such picture element cells and reset (precharge) operation for the next readout operation are conducted simultaneously. A voltage signal formed when said optical current is applied to a load resistance is output after it is amplified by the preamplifier indicated in FIG. 2. In the same way, when the preceding vertical scanning line VLn is high level, the reset operation for the n-th row is carried out in accordance with the time series selecting operation of said horizontal scanning lines HL1 to HLm.

When said readout and reset operations for a pair of rows (1, n) are completed, the horizontal retrace period starts. During this horizontal retrace period, said vertical scanning lines VL1 and VLn are changed to low level from high level, resulting in the non-selecting condition. The terminal RP is set to high level, setting the reset MOSFETs, Q27 Q29 in FIG. 1 to the ON state. Thereby, the prescribed false signal generated on the non-selected horizontal signal line HS2 is reset. The terminal SP is set to the high level and all horizontal scanning lines HL1~ HLm are forced to the selection level. In this case, the vertical scanning line $VL_{n+1}$ corresponding to the preceding next row for sensitivity control is also set to the high level selecting condition. Therefore, all picture elements of a single row corresponding to the vertical scanning line $VL_{n+1}$ for sensitivity setting are read (reset).

Thereby, when said horizontal retrace period terminates and the readout operation starts for the next second row, the horizontal scanning lines HL1 to HLm are sequentially set to high level on the time series basis and said readout signal appears on the horizontal signal line HS2. In this timing, the signal does not appear on the preceding (n+1)th horizontal signal line $HS_{n+1}$ because it is immediately after the forcible reset. If it were obtained, it may be extremely small level and it can therefore be neglected. Accordingly, even if capacitive coupling exists through a substrate between said both horizontal signal lines (HS1, $HS_{n+1}$), the exhaustion signal generated by said reset operation does not leak to said readout signal side. Accordingly, the high image quality readout signal can be obtained by the forcible reset operation in said horizontal retrace period.

The function and effect obtained from said preferred embodiment are as follow.

(1) A first scanning circuit which outputs on a time series basis the signals of a plurality of picture element cells arranged in the form of a matrix and a second scanning circuit which carries out the selecting operation in the vertical scanning direction in accordance with the address independent of the selection address in the vertical scanning direction by said first scanning circuit are provided and variation of sensitivity is realized by operating said second scanning circuit precedingly. Moreover, an external terminal which forces all horizontal scanning lines to be set simultaneously to the selected condition is provided to said horizontal scanning line for selecting picture element cells arranged in the form of a matrix in the horizontal scanning direction, and thereby all picture element signals of the preceding rows can be reset (exhausted) within the horizontal retrace period by the simultaneous selection signal sent from said second scanning circuit and external terminal. Thereby, the effect that the coupling noise for the readout picture element signal may be prevented can be attained because it is possible that generation of the picture element signal can be suppressed substantially on the horizontal signal line corresponding to the preceding vertical scanning lines.

(2) In addition to a first scanning circuit which outputs on the time series basis the signals of a plurality of picture element cells arranged in the form of a matrix, a second scanning circuit which carries out selecting operation in the vertical scanning direction in accordance with the address independent of the selection address in the vertical scanning direction by said first scanning circuit is provided, and thereby the effect that the accummulation time of photoelectric conversion element can be controlled in accordance with time difference in said two vertical scannings can be attained by executing preceding vertical scanning to the vertical scanning by the first scanning circuit with said second scanning circuit.

(3) From the effects (1) and (2), the further effect that a solid state image pickup device having the sensitivity varying function while high image quality is maintained can be obtained can also be attained.

The present invention has been concretely explained on the basis of the preferred embodiment of the present invention. The present invention is not limited only to said preferred embodiment and allows further change or modification without departure from the scope thereof. For example, in the circuit of embodiment in FIG. 1, the interlace gate circuit and drive circuit are capable of employing various types in accordance with the scanning system. Moreover, the vertical scanning lines of the preceding rows may be those which can be set to the selecting condition only during the horizontal retrace period. In this case, generation of noise by capacitive coupling mentioned previously can be prevented perfectly because the readout signal is output only for the horizontal signal corresponding to the rows to be read.

A solid state image pickup device of the present invention can be widely used for picture taking of moving or static images.

The typical device of the present invention disclosed in the present application provides the effect explained briefly hereunder.. Namely, sensitivity varying is realized by providing a first scanning circuit which outputs on the time series basis the signals of a plurality of picture element cells arranged in the form of a matrix and a second scanning circuit which realizes selecting operations in the vertical scanning direction by the address independent of the selection address in the vertical scanning direction by said first scanning circuit, and simultaneously an external terminal which forces all horizonal scanning lines for selecting the picture element cells arranged in the form of a matrix in the horizontal scanning direction is provided and thereby all picture element signals of preceding rows are reset (exhausted) within the horizontal retrace period with the simultaneous selection signal sent from said second scanning circuit and external terminal. Thereby, the picture element signal is not substantially generated on the horizontal signal line corresponding to the preceding vertical scanning line and coupling noise for readout picture element signal can be prevented.

We claim:
1. A solid-state imaging device comprising:
a plurality of picture cells each including a photoelectric converting element and at least one field-effect transistor coupled to said converting element;
a first terminal and a separate second terminal;
a first scanning register for driving the gates of said plurality of picture cell transistors to selectively access said converting elements so that during a first timing period a selected one of said converting elements is coupled to said first terminal through the source-drain current path of a corresponding one of said plurality of picture cell transistors; and
a second scanning register for driving the gates of said plurality of picture cell transistors to selectively access said converting elements so that during a second timing period, different from said first timing period, said selected converting element is coupled to said second terminal through the current path of said corresponding transistor.

2. A solid-state imaging device according to claim 1, wherein from said first terminal a bias voltage for resetting said converting elements is supplied to said converting elements and said second terminal is a signal output terminal.

3. A solid-state imaging device according to claim 2, further comprising means for setting the difference of the scanning timing between said first and second registers.

4. A solid-state imaging device according to claim 1, further comprising means for setting the difference of the scanning timing between said first and second registers.

5. A solid-state imaging device according to claim 1, wherein said selected converting element is coupled to said second terminal through the source-drain current channel path of a corresponding MOSFET.

6. A solid-state imaging device according to claim 1, wherein each one of said plurality of picture cells comprises a series arrangement coupled between reference ground and a horizontal signal line including a photodiode and a pair of series-connected MOSFETs having their gate electrodes respectively coupled to a corresponding horizontal and vertical scanning line and being activated in response to horizontal and vertical scanning pulses, said vertical scanning pulses corresponding to those received from said first and second scanning registers during said first and second timing periods, respectively.

7. A solid-state imaging device according to claim 6, wherein said selected converting element is coupled to said second terminal through the source-drain current channel path of a corresponding MOSFET.

8. A solid-state imaging device comprising:
a plurality of picture cells arranged as a two-dimensional array in combination with a plurality of vertical and horizontal scanning lines, each picture cell comprising a photoelectric converting element and first and second transistors in series therewith, said first transistor having a control electrode coupled to a vertical scanning line, said second transistor having a control electrode coupled to a horizontal scanning line;
a horizontal scanning circuit for selectively activating said horizontal scanning lines;
a first vertical scanning circuit coupled to one end of said vertical scanning lines for selectively activating said vertical scanning lines;
a second vertical scanning circuit coupled to the other end of said vertical scanning lines for selectively activating said vertical scanning lines;
a first terminal and a second terminal;
a first switching circuit driven by said first vertical scanning circuit for selectively coupling said converting elements with said first terminal through corresponding ones of said first and second transistors; and
a second switching circuit driven by said second vertical scanning circuit for selectively coupling said converting elements with said second terminal through corresponding ones of said first and second transistors.

9. A solid-state imaging device according to claim 8, wherein said first and second vertical scanning circuits are vertically disposed on opposite end sides of said picture cell array and said vertical scanning lines are laterally coupled across said picture cell array between said first and second vertical scanning circuits.

10. A solid-state imaging device comprising:
a plurality of picture cells arranged as an array of rows and columns in combination with a plurality of vertical and horizontal scanning lines and a plurality of signal lines, each picture cell comprising an arrangement of a photoelectric converting element and first and second transistors, said first transistor having a control electrode coupled to one of said plurality of vertical scanning lines extending along a parallel direction with respect to said rows, said second transistor being coupled to one of said plurality of horizontal scanning lines which extend along a parallel direction with respect to said columns and, both said first and second transistors of a respective picture cell being responsive to a corresponding horizontal and vertical scanning signal to effect a current path between said converting element and one of said plurality of signal lines extending along a parallel direction with respect to said rows;
a horizontal scanning circuit providing horizontal scanning signals for selectively activating said horizontal scanning lines;
a vertical scanning circuit providing vertical scanning signals for selectively activating said vertical scanning lines;
a signal output terminal;
a switching circuit selectively coupling said plurality of signal lines with said output terminal in response to the operation of said vertical scanning circuit; and
a horizontal reset circuit for resetting said signal lines during each horizontal blanking period.

11. A solid-state imaging device according to claim 10, wherein said horizontal reset circuit comprises a plurality of resetting MOSFETs selectively coupling said signal lines to a resetting voltage in response to a reset gate signal during each horizontal retrace period.

12. A solid-state imaging device according to claim 10, further comprising:

a further vertical scanning circuit for selectively activating said vertical scanning lines;
a reference terminal; and
a further switching circuit selectively coupling said signal lines with said reference terminal in response to the operation of said further vertical scanning circuit.

13. A solid-state imaging device according to claim 12, wherein a resetting voltage for said signal lines in connection with the operation of said horizontal resetting circuit is supplied from said reference terminal.

14. A solid-state imaging device comprising:
a plurality of picture cells arranged as an array of rows and columns and including a plurality of vertical and horizontal scanning lines and a plurality of signal lines, each picture cell comprising the combination of a photoelectric converting element and first and second transistors, said first transistor having a control electrode coupled to one of said plurality of vertical scanning lines extending along a parallel direction with respect to said rows, said second transistor having a control electrode coupled to one of said plurality of horizontal scanning lines extending along a parallel direction with respect to said columns, and both said first and second transistors of each respective picture cell being responsive to a corresponding vertical and horizontal scanning signal to effect a current path between said converting element and one of said plurality of signal lines extending along a direction parallel to said rows;
a horizontal scanning circuit providing said horizontal scanning signals for selectively activating said horizontal scanning lines;
a vertical scanning circuit providing said vertical scanning signals for selectively activating said vertical scanning lines;
a signal output terminal;
a switching circuit selectively coupling said signal lines with said output terminal in response to the operation of said vertical scanning circuit; and
means for simultaneously activating said horizontal scanning lines irrespective of the operation of said horizontal scanning circuit.

15. A solid-state imaging device according to claim 14, wherein said means for simultaneously activating said horizontal scanning lines includes a plurality of diode-connected MOSFETs for coupling a signal selectively applied externally of said array to said plurality of horizontal scanning lines.

* * * * *